United States Patent [19]

Gandini

[11] Patent Number: 4,606,148
[45] Date of Patent: Aug. 19, 1986

[54] DOOR FOR VEHICLES HAVING A BOX STRUCTURE, AND A PROCESS FOR THE MANUFACTURE THEREOF

[75] Inventor: Marcello Gandini, Turin, Italy
[73] Assignee: Clama S.R.L., Turin, Italy
[21] Appl. No.: 615,766
[22] Filed: May 31, 1984

[30] Foreign Application Priority Data

Jun. 10, 1983 [IT] Italy .............................. 67638 A/83

[51] Int. Cl.$^4$ .............................................. B60J 5/04
[52] U.S. Cl. ......................................... 49/502; 49/503
[58] Field of Search ................... 49/502, 503; 296/146

[56] References Cited

U.S. PATENT DOCUMENTS

| | | | |
|---|---|---|---|
| 2,797,127 | 6/1957 | Renno | 49/502 |
| 3,348,337 | 10/1967 | Grasso | 49/503 X |
| 3,370,384 | 2/1968 | Hafer et al. | 49/502 |
| 4,151,683 | 5/1979 | Narita et al. | 49/502 |
| 4,306,381 | 12/1981 | Presto | 49/502 |
| 4,328,642 | 5/1982 | Presto | 49/502 |
| 4,416,088 | 11/1983 | Feucht et al. | 49/502 |

Primary Examiner—Philip C. Kannan
Attorney, Agent, or Firm—Young & Thompson

[57] ABSTRACT

A door for vehicles, mainly comprising a box structure with a downwards open cavity. An assembly formed by the glass and the relevant guides and lifting mechanisms is assembled separately and is then inserted from the bottom into the cavity of the box structure of the door, and fixed therein. The box structure of the door, which may advantageously be made of plastics, is further provided with a recess into which a lock assembly, separately assembled as well, can be inserted. The lock actuating structure can be housed within a recess particularly provided to this end in a protrusion forming an arm rest. With these arrangements, the expensive operations which have to be performed on the door installed on the vehicle are minimized, thus reducing the assembly costs and time.

9 Claims, 3 Drawing Figures

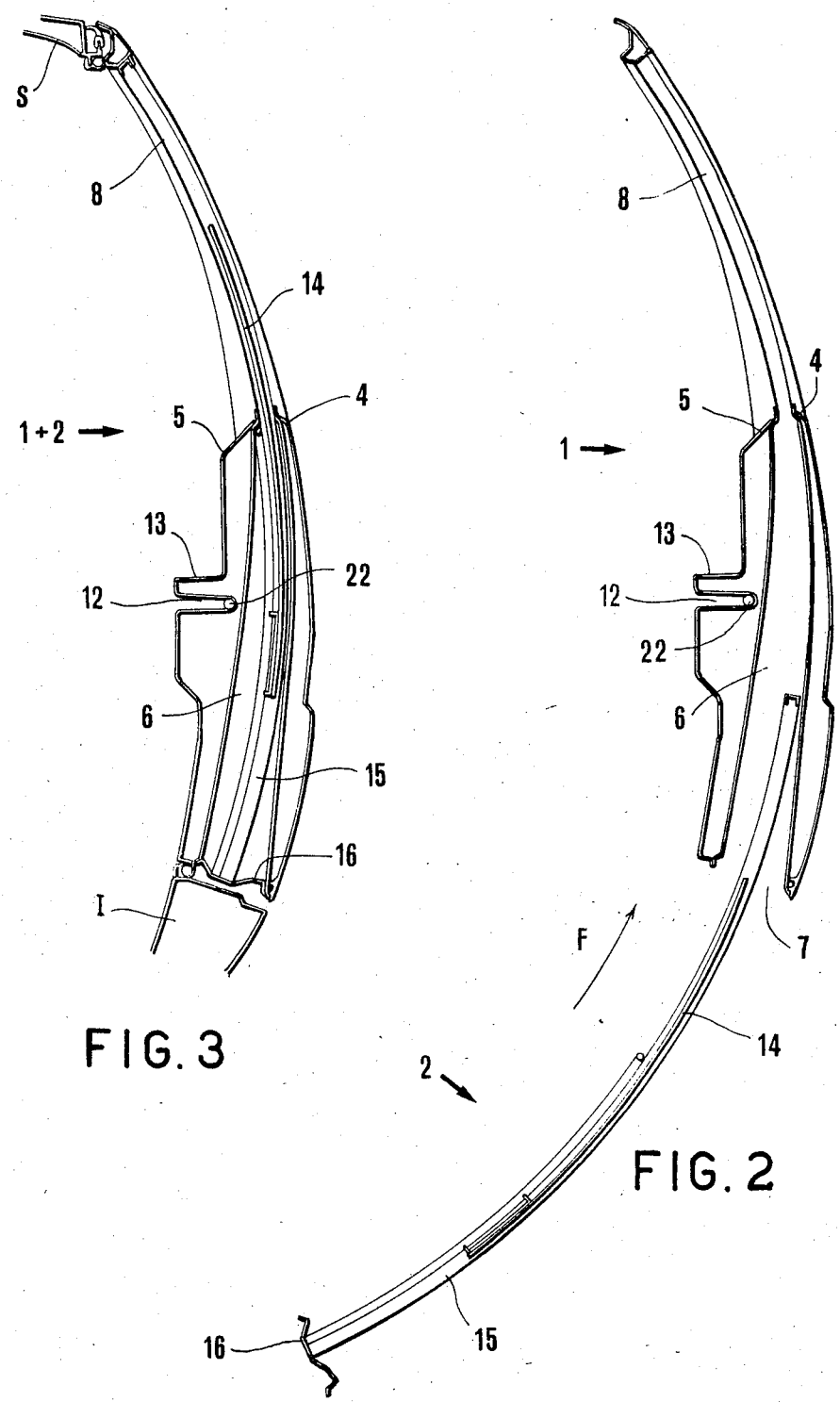

DOOR FOR VEHICLES HAVING A BOX STRUCTURE, AND A PROCESS FOR THE MANUFACTURE THEREOF

BACKGROUND OF THE INVENTION

This invention relates to a door for vehicles.

According to present techniques, the door of the vehicles, either made of metal plate or of plastics, must be provided with various complementary parts, such as the glasses, the respective lifting mechanisms, the locks and their actuating means, which are mounted when the door is already installed on the vehicle body, by operations which result in being of hard organisation, and whose execution is difficult and uncomfortable also because of the insufficient accessibility of some assembly positions. The use of structures made of plastics for the doors has not improved this situation because the door design criteria, developed for metal plate constructions and unsuitable to allow making the best use of the properties of the plastic material, remained substantially unmodified.

BRIEF SUMMARY OF THE INVENTION

The main object of this invention is to rationalize and to render more economical the construction of the vehicle doors, by avoiding or reducing the necessity of difficult assembly operaions to be carried out on the installed door. Another object of the invention is to develop a door structure suitable for being manufactured of plastics by advantageously utilizing the characteristics of such material.

According to this invention, a door for a vehicle comprises a box structure, with an inner cavity and a lower opening, and an assembly, including a glass and the relevant guides and lifting mechanisms, separately assembled and slip inserted into the inner cavity of the box structure, extending from said lower opening.

Thanks to these characteristics, the relatively complex mechanical operations for mounting the glass lifting mechanisms, instead of being carried out on the installed door, may be performed separately, i.e. under industrially much more advantageous conditions, and on the installed door it is only necessary to join the thus separately mounted glass assembly, an operation which is carried out by simply introducing said assembly from the underside into the inner cavity of the door structure, and by fixing it therein. It is thus possible to obtain both a reduction in the production costs of the components and, mainly, a better organization of the assembly operations with noticeable reduction in the respective costs.

Said box structure of the door could be made of metal plate, but advantageously it may also be made of plastics. Depending on the different opportunity conditions which may occur, the box structure made of plastics may be integral in its construction, or it may be obtained by assembling two separately produced shells defining together the cavity of the structure.

It is preferred that said glass assembly is assembled on a base plate corresponding to said lower opening of the box structure, and it is inserted into said inner cavity of the door structure with the base plate occluding at least partially said lower opening.

Preferably, said box structure has also a recess at the opening side of the door, and a lock assembly is separately mounted, said lock assembly being inserted into and fixed within said recess of the door box structure.

Thanks to this feature, also the assembly operations of the lock with its various opening and locking devices are carried out separately under the best working conditions, and on the installed door it is only necessary to insert and fix the thus already mounted assembly, by operations which are reduced to a minimum.

The advantages of this arrangement are increased to a maximum degree if the lock assembly is provided with actuating means comprising the opening and locking controls, so arranged as to extend outside the door structure on the inner side of the door.

BRIEF DESCRIPTION OF THE DRAWINGS

These and other features and advantages of the invention will be more clearly apparent from the following description of an embodiment given by way of a non limitative example and diagrammatically shown in the annexed drawings, in which:

FIG. 2 is a diagrammatic sectional view of the box structure of the door and of the glass assembly during the insertion operation of the latter;

FIG. 3 is a view similar to FIG. 2, showing the box structure of the door and the glass assembly in its completely inserted position.

DETAILED DESCRIPTION OF A PREFERRED EMBODIMENT

Figure 1:
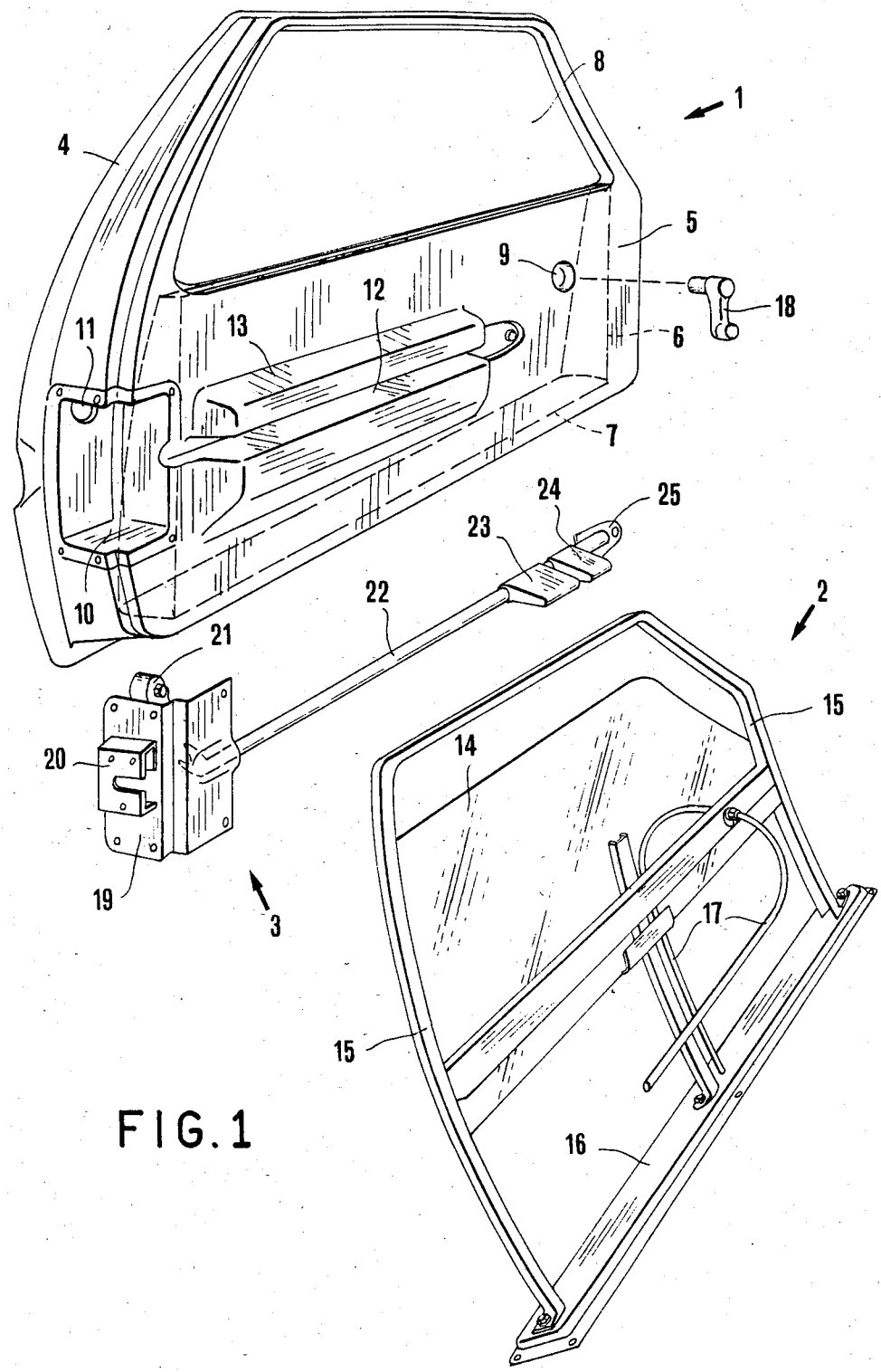
FIG. 1 is a perspective view showing, in a still separate condition, box structure made of plastics for a vehicle door, and the glass and lock assemblies, respectively.

Reference numeral 1 generally indicates the box structure of the door, which, in this example, is made of plastics; reference numeral 2 indicates the assembly comprising the glass, and reference numeral 3 indicates the lock assembly.

Structure 1 of the door comprises two shells, namely an outer shell 4 and an inner shell 5, which define between them an inner cavity 6 with a lower opening 7. The two shells 4 and 5 may be separately manufactured and then joined by welding, by glueing, or otherwise, or else they may be two portions of an integral structure formed, for exmaple, by rotation molding, and the choice among these possibilities depends on the available production means and on design preferences.

Advantageously, each shell is formed with relatively thin walls made of rigid plastic material, and the spaces resulting between said walls are filled with foamed plastics, thereby conferring to the whole a noticeable stability and good thermal and acoustic insulation properties. For the same reasons set forth above, each shell may also be composed by a plurality of parts separately produced and then assembled, and, in case of necessity or suitableness, some of said parts may also be made of metal.

The glass assembly 2 comprises the glass 14, the relevant guides 15, which in this case are fixed onto a base 16, and the mechanism 17 for lifting the glass 14, as well as, if suitable, further components intended to stiffen and to reinforce this structure. The whole is configured and sized in such a way as to correspond to the free space provided by the inner cavity 6 of the door structure 1, with the glass 14 extending in register with a window 8 defined by the structure 1. In the embodiment shown, the base 16 corresponds to the lower opening 7 of the door structure, whereby, when the glass assembly 2 is mounted into the door cavity 6, the base 16 substantially occludes the lower opening 7. The glass assembly 2, separately manufactured and then assembled, is installed by introducing it into the structure 1 from the underside thereof, according to the curved arrow F, as shown in FIG. 2, until reaching the final configuration shown in FIG. 3, in which the base 16 is fixed to the shells 4 and 5. The so completed door is adapted to close in a sealing manner a corresponding opening defined between upper elements S and lower elements I of the vehicle body, as shown in FIG. 3.

Preferably, the coupling between the base 16 and the edge of the opening 7 of cavity 6 is caried out in a not sealing manner on the outer side, so that any water, seeping into the cavity 6 may freely flow outwards; in this way, it is not necessary to provide any seal between the glass assembly 2 and the outer shell 4 of the structure 1.

Alternatively, the base 16 can be incomplete, so as not to occlude the lower opening of the door cavity, or it may be reduced to simple means for joining the glass assembly 2 to the door stucture 1.

Provided in a suitable position in the inner shell 5 there is a hole 9 intended to allow mounting a crank 18 for actuating the mechanism 17 for lifting the glass 14.

On the opening side of the door, structure 1 has a recess 10 which communicates with the outside through an opening 11. A lock assembly 3 is separately formed and assembled, and it comprises a plate 19 supporting the means 20 for the engagement with the counterlock mounted in the vehicle body, a push-button 21 or other opening means, intended to be operated from the outside through the opening 11, and a transmission 22 for levers or other control means 23 and 24, for opening the lock from the inside and for locking the same. This lock assembly is applied on the structure 1 by inserting its mechanisms into the recess 10, which is then closed by the plate 1, and by arranging the inner actuating means 22-24 to extend along the inner side of the structure 1, to which they are fixed by means of an end support 25, In this way one can avoid the expensive installation, normally carried out below the door finishing panels, of the transmission means between the lock and its inner control means. Thus, the door may be completely finished on the inner side, even with possible coatings or aesthetic accessories, prior to the application of the lock.

Suitably, the inner shell 5 of the structure 1 is formed with a protrusion 13 forming an arm rest. Formed in this protrusion 13 there is a recess 12 which allows the passage of the transmission means 22 of the lock and hides them in a practically complete manner, still allowing the unhindered installation thereof. Preferably, the transmission means 22 are formed by a tubular transmission for the control member 23 and by a coaxial inner stem for the control member 24. However, the lock and its control means form no part of the present invention and so will not be further illustrated or described.

The door according to the invention, formed by the described components and assembled according to the process set forth hereinabove, allows to organize in the best way the assembly of a vehicle of which the door is a part, by avoiding the necessity of operations to be performed after the door has been installed on the vehicle, or reducing such operations to a minimum, thus considerably contributing both to the provision of doors having advantageous features and to the economy of the production.

Although, as already said, the application of the invention appears particularly advantageous in the manufacture of structures made of plastics, the invention proves convenient also for metal plate structures or for structures made of heterogeneous materials.

The invention applies to doors of any type, such as front doors, rear doors, single doors, tail gates and the like. Obviously, in the practice of the invention, the shapes of the parts can and often must be variously modified in order to make them correspond to the technical and aesthetic requirements of the various vehicles; the modifications stated, and others, can be introduced, and all the parts indicated herein may be substituted by their technically equivalent means.

I claim:

1. A door for vehicles, comprising a box structure having an inner side, an outer side, an inner cavity and a lower opening, and a glass assembly, including a glass, guide means for said glass and lifting mechanisms, said glass assembly being separately assembled and being slip inserted into said inner cavity of the box structure, extending from said lower opening.

2. A door for vehicles as set forth in claim 1, wherein said box structure has at least one opening traversing said inner side, and said glass lifting mechanisms have control means traversing said opening.

3. A door for vehicles as set forth in claim 1, wherein said box structure has a door opeining side, and includes a recess at said door opening side adapted to receive a lock.

4. A door for vehicles as set forth in claim 1, where in said box structure of the door has, on said inner side, a protrusion in the shape of an arm rest, and a recess provided in said protrusion for passage of a lock actuating means.

5. A door for vehicles as set forth in claim 1, wherein said box structure of the door is made, at least to a main part thereof, of plastics.

6. A door for vehicles as set forth in claim 5, wherein said box structure mainly made of plastics is substantially integral in its construction and contains said inner cavity.

7. A door for vehicles as set forth in claim 5, wherein said box structure mainly made of plastics comprises at least two shells separately manufactured and assembled together, which define between them said inner cavity.

8. A door for vehicles as set forth in claim 1, wherein said glass assembly comprises a base plate having a general shape corresponding to that of said lower opening of the box structure, and said glass assembly is inserted into said inner cavity of the door structure with the base plate thereof occluding at least partially said lower opening.

9. A door for vehicles as set forth in claim 8, wherein said base plate of the glass assembly is applied to said box structure of the door without sealing towards the exterior, whereby any water seeping into the cavity of the box structure is allowed to flow out therefrom.

* * * * *